Nov. 28, 1972     S. T. NERENBERG     3,704,217
SEGMENTAL MACROMOLECULAR SEPARATION METHOD AND APPARATUS
Filed Sept. 8, 1969
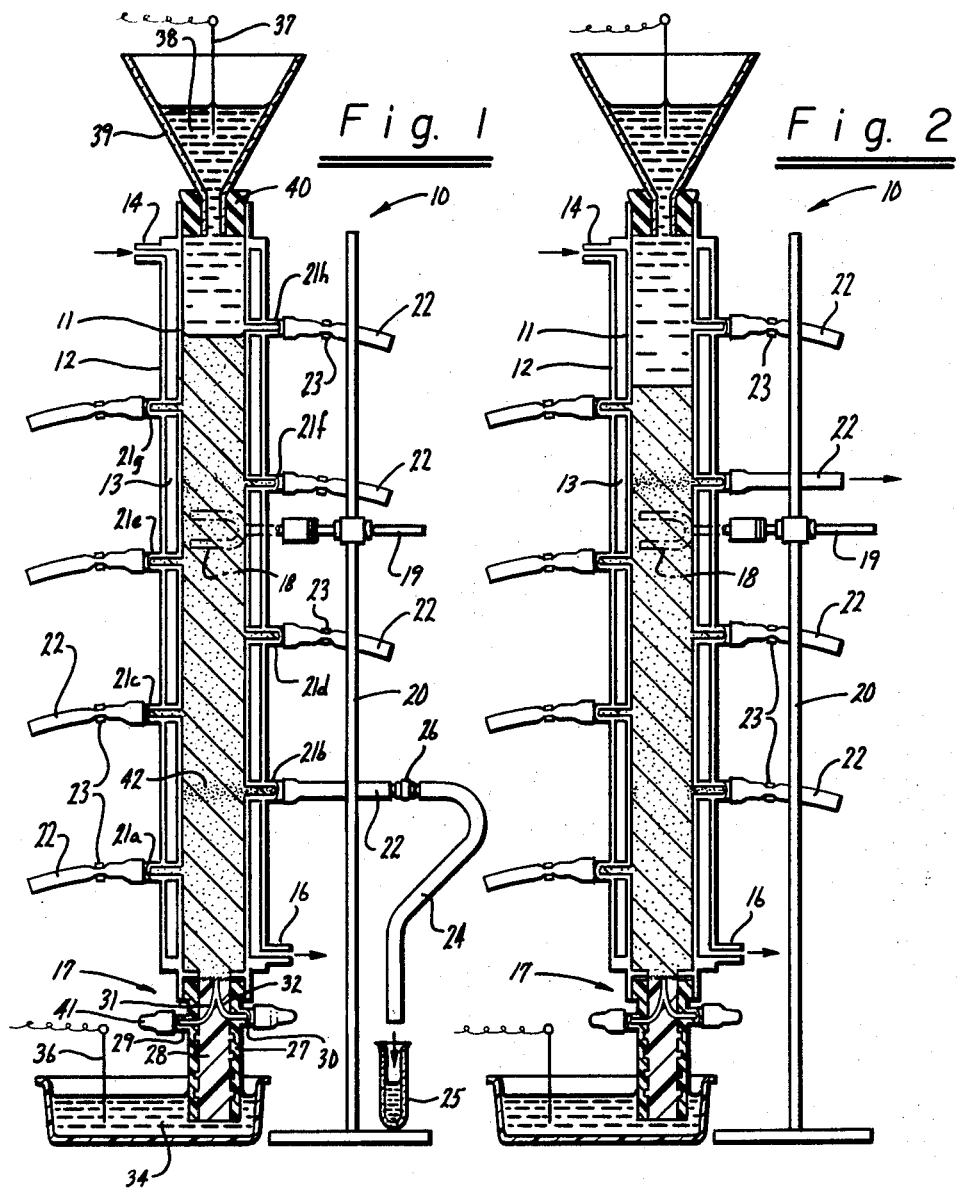
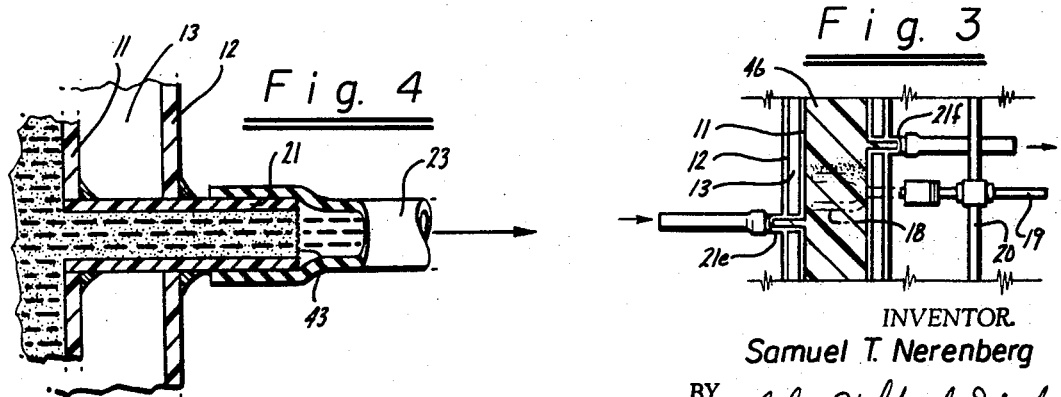
INVENTOR.
Samuel T. Nerenberg
BY
Attorneys

United States Patent Office 3,704,217
Patented Nov. 28, 1972

---

3,704,217
SEGMENTAL MACROMOLECULAR SEPARATION METHOD AND APPARATUS
Samuel T. Nerenberg, 21 Hayward Court, Burlingame, Calif. 94010
Continuation-in-part of application Ser. No. 831,509, June 9, 1969. This application Sept. 8, 1969, Ser. No. 855,966
Int. Cl. B01d 13/02; B01k 5/00
U.S. Cl. 204—180 G                   13 Claims

ABSTRACT OF THE DISCLOSURE

A process and apparatus for the segmental separation by chromatography, electrochromatography, and electrophoresis of a mixture of macromolecules by means of a separation gel medium disposed in a multiported, upstanding, elongated column. The macromolecules are separated into bands across the gel and selected bands are removed through a convenient one of such ports.

BACKGROUND OF THE INVENTION

Column chromatography is widely used for the separation of mixtures of macromolecules such as proteins, carbohydrates, or fats on cross-linked, insoluble granular gels such as the dextran gel known as Sephadex. In my copending U.S. application, Ser. No. 831,509, filed June 9, 1969, incorporated herein by reference, a method and apparatus is described for converting Sephadex columns and other columns to perform chromatography, electrochromatography, and electrophoresis. As described therein, an adapter, such as a tubular housing containing an electrically conductive, self-supporting gel, is attached to the lower portion of an upstanding separation column containing a granular or nongranular gel separation medium. In operation, the protein mixture and a buffer solution are fed to the top of the separation column and the proteins are separated into component bands in the gel medium. When the separation into bands is performed by electrophoresis in a nongranular gel, individual components may be analyzed by removing the entire gel from the column and cutting each band from the remainder of the column. Alternatively, after electrophoresing the component bands to the bottom of the nongranular gel, a buffer solution may be supplied through a channel in the adapter to contact the bottom of the gel as each protein component flows thereto to wash each component through a second adapter channel to an analyzer. In a further alternative, a column may be employed for separations on granular gels by means of electrochromatography or chromatography. After the separation of the components into bands, they are washed through the column by buffer solution flow and out a channel in the adapter.

One disadvantage of such separation columns utilizing granular or nongranular chromatographic gels is that the separated component bands must proceed throughout the entire length of the column before elution for analysis. Invariably, a certain amount of contamination occurs due to adsorption of small amounts of faster moving component bands by the separation gel which are mixed with the slower moving bands.

Another disadvantage of such separation columns employing granular gels is that it is not possible to directly remove one or more segments of the granular gel from a portion of the whole gel without disturbing the overall chromatographic procedure or the relationship of the remaining portions of the gel.

A further disadvantage of such columns is the relatively large amounts of time required to perform a separation since each protein or other component band must be washed throughout the entire length of the column before that component may be collected in the effluent for analysis.

A still further disadvantage of performing chromatography or electrochromatography in such a column is that there is no means for directly removing a protein component within the granular gel simultaneously from the column.

SUMMARY OF THE INVENTION AND OBJECTS

This invention is directed to a segmental separation column and to the separation of macromolecules by electrophoresis, chromatography or electrochromatography performed therein.

The separation column is formed of a jacketed elongated tubular plastic housing to contain a separation gel medium. A series of ports, selectively operable between opened and closed positions, are disposed at spaced intervals along the housing, preferably on alternating sides of the housing. The separation medium may be a granular gel, such as dextran, for chromatographic, electrochromatographic, and electrophoretic separations of protein or other biological mixtures. Alternatively, the medium may be a viscous liquid, or a nongranular, electrically-conductive gel for electrophoretic, chromatographic or electrochromatographic separation. For chromatography, the separation column may be formed of a column similar to a conventional Sephadex one by providing it with ports for communication between the gel and the surroundings. Such a ported Sephadex column may be modified to perform electrophoresis by means of an adapter similar to the one employed in the aforementioned application.

In operation, a protein or other mixture and buffer solution ar fed to the top of such a separation column wherein the protein components are separated into discs or bands in the gel by chromatography and/or electrophoresis. These discs may be driven downwardly to a position adjacent to one of the column ports by continuously feeding buffer solution to the top of the column. In a chromatographic separation, the solution flows out the bottom of the column. Alternatively, by supplying current along the column, such bands may be moved upwardly to a position adjacent to a port. In either event, such a port may be opened to allow the removal of such protein fractions in buffer solution separated from the gel by placing a filter over the outlet port. Alternatively, the removal of the protein component, buffer solution, and proximate gel may be accomplished by eliminating such a filter at the outlet port.

A number of different separation techniques may be performed in the above column. For example, by closing off both ends of the column after separation of the sample into bands by electrophoresis in a viscous liquid gel, additional gel may be forced through one port to a point below a band to drive the band and proximate column gel out a second open port above the band without movement in the remainder of the column.

In another modification, a protein sample may be mixed with an electrically-conductive gel at the bottom of the column which is subsequently solidified. By applying an electric current to the bottom of this gel, the sample may be separated into bands which proceed upwardly to the top of the gel. These bands may be eluted from the column by a buffer solution out a port located above the top of the gel.

It is a general object of the invention to provide a means for the separation of macromolecules which overcomes the disadvantages of known techniques.

It is a further object of the invention to provide a means for the segmental separation of macromolecules by chromatography, electrochromatography, or electrophoresis.

It is a further object of the invention to provide a means for the direct removal of a macromolecular fraction which has been separated into a band in a separation gel column by chromatography, electrochromatography or electrophoresis without disturbing the relationship of the remainder of the gel.

It is another object of the invention to provide a system for the rapid elution of separated macromolecular bands from such a separation gel medium.

It is a further object of the invention to provide a separation gel column in which separated macromolecular component bands in the gel may be removed with or without the gel proximate thereto.

It is a still further object of the invention to avoid the contamination of slower moving molecular component bands which would normally have to travel throughout the length of a separation column picking up portions of the faster moving bands which leave small fractions of the protein behind.

Other and further objects of the invention will be apparent from the following description taken in conjunction with the drawings appended thereto.

BRIEF DESCRIPTION OF THE DRAWINGS

FIGS. 1 and 2 are elevational views in section of two embodiments of the invention.

FIGS. 3 and 4 are enlarged sectional views of portions of two embodiments of the invention.

DESCRIPTION OF THE PREFERRED EMBODIMENTS

In general, the separation apparatus and process of the present invention is an improvement of the one described in my copending application Ser. No. 831,509. The apparatus described therein included a granular chromatographic separation gel, such as Sephadex, deposited in a cooled separation column with a lower support for the gel containing an outlet port. When a buffer solution and sample protein mixture is fed to the top of the column and out the port, protein components may be separated into bands by chromatography and recovered through the port for analysis. To carry out electrochromatography, an adapter such as described in my copending application is attached to the bottom of the column and an electric current is supplied to buffer reservoirs at the top and bottom of the gel and transmitted to the gel. In the present invention, the apparatus is modified to include a series of inlet and outlet ports which improve the operation of the column.

Referring to the drawings and particularly to FIG. 1, segmental separation column assembly 10 includes an internal elongated tubular column 11 and an external concentric column 12 affixed thereto, suitably by welding. Columns 11 and 12 cooperate to form an annular cooling jacket 13 for the flow of a cooling fluid, such as water or Freon, from inlet opening 14 to outlet opening 16. The bottom of column 12 is adapted for sealing engagement with a separation column adapter assembly 17, described hereinafter. Alternatively, to perform only chromatography, a Sephadex-type column bottom with an outlet for buffer solution may be secured to the bottom of column 11 (not shown). The column assembly may be supported by a clamp 18, affixed at one end to column 11 and at the other end to an adjustable sidearm 19 slidably received by a ring stand 20.

A series of inlet or outlet ports 21a–h in the form of spouts are provided at staggered intervals on alternate sides of assembly 10 to provide fluid communication between the contents of column 11 and the surroundings. The base of the spouts are welded to openings in column 11 to form a liquid seal. Similarly intermediate spout portions are sealed to external column 12 by welding to protect against cooling fluid leakage. Each port 21 is fitted with flexible rubber tubing 22. Fluid flow through this tubing may be selectively opened or closed by means of adjustable screw clamps 23. Buffer solution containing separated protein may be removed from the column via flexible tubing 22 sealingly secured to tubing 24 by hollow adapter 26. The proteins in solution may then be fed into a test tube 25 for subsequent analysis (e.g., with an ultraviolet monitor).

Referring to FIGS. 1 and 2, the adapter assembly 17 may be similar to the one employed in my aforementioned application. The assembly includes an open tubular housing 27 and an electrically-conductive, self-supporting solidified gel 28 formed therein (hereinafter called the adapter gel). The housing contains inlet and outlet openings 29 and 30, respectively. Inlet passage 31 in gel 28 serves to provide liquid communication between the upper surface of gel 28 and inlet opening 29 while outlet passage 32 provides communication between the upper gel surface and outlet opening 30. Adapter assembly 17 is capable of transmitting an electric current to allow electrophoresis and electrochromatography to be carried out in column 11.

Referring to FIG. 1, column assembly 10 is set up for either chromatography or electrochrommatography. Inner column 11 is filled with a granular separation gel 33 (e.g., granular acrylamide, exchange resins, hydroxylapatite or a dextran gel, such as Shephadex). As discussed in the aforementioned application, Sephadex is the preferred separation gel. To supply the electric current for electrochromatography or electrophoresis, the adapter assembly gel is in contact with a lower buffer reservoir 34 in which is placed electrode 36. An electrode 37 is immersed in an upper buffer reservoir 38 fed to the separation column through funnel 39 which extends through the opening of rubber stopper 40. For electrochromatography in the downward direction, a dialytic membrane may be employed to stop the protein frfom proceeding into the adapter gel. Also a filter (e.g., a fine mesh nylon cloth) should be placed over the top of the adapter passages to prevent gel flow. The membrane and filter may be similar to the ones utilized in my copending application.

In one segmental separation technique utilizing ports 21, a protein sample (e.g., human serum) to which is added a small amount of dye (e.g., bromphenol blue dye powder) is fed along with buffer solution to the top of the separation column 12. By allowing the buffer solution to flow through the column and outlet 30 applying current upwardly in the column for electrophoresis, the sample may be formed into distinct component bands 42 which are visible or labeled due to the dye. To recover a particular band it may be brought up to the level of the closest port 21 by discontinuing the chromatographic procedure (as by closing off outlet 30) while continuing the flow of electric current. Alternatively, the band may be brought down to the level of the closest port by reducing the electric current and continuing chromatography so that the labeled disc slowly descends in the column to a level adjacent such port.

Referring to FIG. 4, with the separated protein disc directly opposite a particular port, the protein may be eluted by placing a screen 43 such as filter cloth over the spout and then opening clamp 18 to permit the buffer and separated protein, but not the gel, to flow out tubing 24. However, the elution of the separated protein band and buffer solution from the lowered segment of gel should only be performed at the end of a downwardly sequential elution technique. For example, spout 21h would be first opened to allow the buffer solution thereabove to flow out followed by opening of spout 21g for the same purpose, etc. until the port adjacent the disc to be removed is reached (port 21b in FIG. 1). This procedure prevents the buffer on top of the column from carrying or chromatographing proteins from the upper gel sections to the lower sections.

Alternatively, the granular gel may be discharged along with the buffer solution and protein component band by omitting screen 43 and allowing the gel and solution to flow through the port immediately below the protein component band. Gel and buffer solution above the withdrawn portion of gel descends in the column under the force of gravity to fill the space left by the removed portion. Additional portions of gel may be removed in a similar manner. Unlike the elution technique, by opening a spout just inferior to gel segments to be removed, such segment or segments may be taken from a central or lower portion of the column. If further electrophoresis in the upward direction were desirable, fresh gel may be added to the surface of the gel remaining in the column to replace the portion thereof.

One advantage of gel removal along with the component solution is that the component may be withdrawn with relatively little dilution in comparison to elution of the solution while leaving the gel. A disadvantage is the requirement for subsequent separation of the gel and protein solution as described hereinafter.

After removal from the separation column, one method to segregate the gel from the protein fraction contained in the buffer solution is by centrifugation (e.g., at 10,000 r.p.m. in a refrigerated centrifuge). The entire supernatant, containing the protein may be decanted for analysis. Alternatively, a small sample of the supernatant may be removed as a control to be compared with the results of a second separation. The removed gel may be thoroughly mixed with an additional amount of buffer solution and placed on top of a second column of chromatographic granular gel (e.g., Sephadex G–100) containing a small amount of buffer overlay. Additional buffer solution may be added to the top of the column and one or more of the following procedures may be performed: downward chromatography, continuous electrochromatography, interrupted electrochromatography, or a repetition of a procedure as described herein.

Ports 21 are preferably placed at staggered intervals on alternate sides of the solumn especially when the gel is allowed to flow out of the column with the buffer solution. If the ports were restricted to only one side of the column, the upper surface of the gel would tend to form an acute angle with the horizontal. By a staggered alternate placement of ports, the gel plane remains substantially horizontal.

In a further alternative use of the segmental separation column, a nongranular separation gel as described in my copending application 831,509 may be employed. For example, protein mixture, such as blood serum, is dispersed in a 5% polyacrylamide solution, and is deposited in the bottom of column 11, stoppered as described therein. The stopper is then removed and adapter assembly 17 attached to the bottom of the column. Then the second gel solution (e.g., about 20 ml. of 7.5% acrylamide) is poured into the top of the aforementioned serum-dispersed gel and allowed to harden. After hardening, a layer of granular separation gel, such as Sephadex, is deposited over the top gel. An electric current may then be applied upwardly to electrophores and more rapidly migrating proteins into the Sephadex gel as a band therein. As previously discussed, such protein bands may then be either eluted or removed in situ with the granular gel at a selected port which is opened adjacent to the band. Alternatively, the protein samples may be removed from the column for analysis by a regulated downward flow of buffer solution through such open port. In a further use of the segmental separation column, discontinuous electrochromatography may be carried out. For example, after chromatographing a protein sample downwardly through the column with all ports closed, chromatography may be stopped and an electric current applied upwardly for electrophoresis. Selective ports toward the top of the granular gel (e.g. 21i) may then be opened to draw off the protein sample by a slow, continuous or interrupted flow of buffer from the upper buffer reservoir through such port. As previously discussed, this sample then may be automatically analysed by such means as an ultraviolet monitor.

Another technique for utilizing the segmental separation column is by discontinuous electrochromatography. After downward chromatography of a protein mixture, an electric current may be applied upwardly to drive the proteins a short distance to an available port which is opened. The proteins may then be eluted by the downward flow of buffer while continuing the flow of electric current. The shortness of the granular gel section through which the protein bands are eluted minimizes contamination by the mixing of separated fractions. As previously discussed, the gel in situ with the protein discs may be removed along the with the protein sample by eliminating the gel screen at the outlet port. If the gel is thus removed, the separation may be continued by adding fresh granular gel to the top of the gel column with the continuation of electrophoresis. The procedure may be repeated as long as the proteins which migrate due to the electric current are present in the gel. One advantage of this technique is that the electrophoresically mobile bands may be continuously removed as they enter a particular area of the gel by opening a port in that section. Thus, a sample need not be drained out in either end of the column, a procedure which can cause "band spreading" and a concomitant loss of resolution on analysis.

Referring to FIG. 2, a separation column may be effectively used to carry out a process of electrophoresis in a granular gel by closing off the openings in adapter assembly 17 and applying current to electrodes 36 and 37. As previously discussed, by electrophoresing in an upward direction after descending chromatography, a protein band may be moved upwardly to a po int adjacent to a port for removal (e.g., port 21f in FIG. 2).

A still further use for the apparatus of the present invention is illustrated in sequence by FIGS. 1 and 3. For example, the apparatus of FIG. 1 with the adapter assembly ports closed could be filled with an electrically-conductive viscous liquid 46 (e.g., a 2% polyacrylamide gel and a buffer solution) to perform an electrophoretic separation. After the protein bands are formed, the top of the column may be sealed off with a stopper. Then additional liquid 46 may be fed through a port immediately below the protein band desired to be removed (e.g., the lower port in FIG. 3). The port immediately above the disc is opened and the liquid and the protein band are directly removed therefrom. This technique provides a minimum opportunity for contamination due to the short portion of gel involved in the removal process. After removal by this technique, electrophoresis may be continued or the remaining protein segments may be removed in a similar manner.

In order more clearly to disclose the nature of the present invention, specific examples of the practice of the invention are hereinafter given. It is to be understood, however, that this is done by way of example and is not intended to limit the scope of the invention or the appended claims.

EXAMPLE I

A sample of human serum was separated into multiple fractions using the apparatus of FIG. 1. About 10 ml. of human serum to which was added a few grains of bromphenol blue dye powder (for color) and approximately 1.0 gm. of sucrose (to increase the density of the serum) was layered on the upper portion of the granular gel (Sephadex G–100 superfine gel) by opening the outlet port of the adapter assembly and allowing the buffer solution to flow. Electrochromatography was then carried out with electrophoresis in the upward direction and chromatography in the downward direction. The procedure was started toward the end of the work day and allowed to run overnight using 200–300 volts and 5–10 ma. (If they were "run" or carried out during a regular work day a larger input of power (e.g., 500 volts and 15 ma.) may be used to shorten the time for partition.) In the morning following an overnight "run," the bromphenol blue label formed three distinct bands or discs: the uppermost band representing unattached or free dye, the next lower band representing prealbumin, and the lowest band representing albumin. To recover the labeled prealbumin band, it was either driven up to the level of the next highest port by discontinuing chromatography or driven down to the level of the next lowest port by reducing the electrophoretic current while allowing chromatography to proceed. The disc was eluted for analysis by permitting buffer located in the upper reservoir to flow through the port and carry the separated protein out. The remaining (unlabeled) serum proteins were eluted from each port to a fraction collector for analysis by an ultraviolet monitor.

EXAMPLE II

A separation of hemoglobin (AC) was performed in a similar manner to that described in Example I. Since the hemoglobin is naturally colored, it was not necessary to add an artificial dye. As described in Example I, the hemoglobin was placed on top of the gel and electrophoresed downwardly into the gel overnight, Referring to FIG. 1, the eluting fraction (hemoglobin A) descended to a level just below port $c$ while the slower moving fraction (hemoglobin C) came to a position just above spout $21f$. Hemoglobin C was then removed in situ with the gel in just a few minutes by opening port $21e$. Hemoglobin A was then removed in a similar fashion by opening port $21c$. The separated hemoglobin fractions were obtained in a concentrated form by collecting the colorless first portion of the granular gel separated from the highly colored portion containing the highly concentrated hemoglobin. The gel containing the hemoglobin was then centrifuged and the supernatant hemoglobins removed. A second extraction was then performed to remove most of the remaining hemoglobin still in the gel.

Essentially complete recovery of the total amount of hemoglobin sample placed in the column was obtained. A small variable amount of denatured hemoglobin remained on top of the gel without entering therein. After the fractions of hemoglobin A and C had migrated below the port $21h$ the denatured hemoglobin was removed directly from the column and discarded by opening that port.

Although the invention is described in terms of the separation of proteins, it is understood that other macromolecules such as carbohydrates and fats may be employed.

The multiported apparatus of the present invention enables the rapid and efficient isolation of protein fractions for use in the production of antibodies in selected animals and provides the clinical pathologist with a direct method of obtaining potent specific immunologcal reagents for diagnostic use in the clinical laboratory.

It is apparent from the foregoing that I have provided a new and improved separation column for chromatography, electrochromatography, and electrophoresis which permits the removal of a separated protein fraction from any portion of the whole gel without disturbing separative procedures for, or the relationship of the remaining portion of the gel. Therefore, the time for such separative operations is reduced. Furthermore, by utilizing the apparatus, contamination of separated fractions with other fractions due to "tailing" is minimized. A further convenience of the apparatus is that buffer solution fed to the top of the separation gel may be conveniently removed at a port adjacent thereto.

What is claimed is:

1. In a method for separating components of a mixture of macromolecules, the steps of feeding the macromolecular mixture in a buffer solution to an elongated, upright continuous separation gel medium, electrophoretically separating said mixture into at least two distinct spaced component bands across said medium, directing each of said two component bands to positions adjacent to ports located at different levels along said medium, and removing said two bands through corresponding adjacent ports located at different levels above the bottom of said medium.

2. A method as in claim 1 in which the macromolecular mixture is fed to the medium through one of said ports.

3. A method as in claim 1 in which the separation medium is an electrically conductive viscous liquid.

4. A method as in claim 3 in which one of said bands is removed from said medium in situ in said viscous liquid through one of said ports by feeding a quantity of said viscous liquid to a port at a different level to force said one band out said removal port without movement in the remainder of the column.

5. A method as in claim 1 wherein said gel is formed of granules capable of chromatographic separation.

6. A method as in claim 5 including the further step of chromatographically separating said component bands by allowing the mixture and buffer to flow downwardly through the gel under gravitational force.

7. A method as in claim 6 wherein said electrophoretic separation is carried out simultaneously with said chromatographic separation to perform an electrochromatographic separation.

8. A method as in claim 7 wherein the electric current is applied to produce an upward force on the macromolecules opposite to the force of gravity to provide distinct band separation.

9. A method as in claim 8 wherein after the mixture flows to a predetermined level during chromatography it is forced upwardly by the current to said ports for removal.

10. A method as in claim 9 wherein the band and medium in situ therewith are withdrawn simultaneously.

11. A method as in claim 10 in which after withdrawal additional separation medium is added to the column and electrophoretic separation is recommenced.

12. A column assembly for separating a mixture of macromolecules by means of electrophoresis or electrochromatography said assembly comprising an elongated upstanding hollow tubular housing, a continuous separation gel medium disposed in said housing, a series of ports selectively operable between opened and closed positions and disposed at spaced intervals along the housing intermediate the ends thereof, each of said ports being in fluid communication with said gel medium, adapter means in sealing engagement with the lower end of said housing, an electrically conductive self-supporting gel disposed within said adaptor and forming a seal therewith against liquid flow, and means for supplying electric current to said separation gel medium.

13. A column assembly as in claim 12 in which at least some of said ports are disposed on alternate sides of said housing at staggered intervals.

References Cited

UNITED STATES PATENTS

| | | | |
|---|---|---|---|
| 2,487,574 | 11/1949 | Meng | 210—31 C |
| 3,290,240 | 12/1966 | Neren | 204—299 |
| 3,326,790 | 6/1967 | Bergrahm | 204—180 G |
| 3,346,479 | 10/1967 | Natelson | 204—301 |
| 3,453,200 | 7/1969 | Allington | 204—301 |
| 3,492,396 | 1/1970 | Dalton et al. | 424—12 |
| 3,506,554 | 4/1970 | Broome | 204—180 G |
| 3,533,933 | 10/1970 | Strauch | 204—180 G |

JOHN H. MACK, Primary Examiner

A. C. PRESCOTT, Assistant Examiner

U.S. Cl. X.R.

204—299